United States Patent
Depew et al.

(10) Patent No.: US 7,299,331 B2
(45) Date of Patent: Nov. 20, 2007

(54) METHOD AND APPARATUS FOR ADDING MAIN MEMORY IN COMPUTER SYSTEMS OPERATING WITH MIRRORED MAIN MEMORY

(75) Inventors: Kevin G. Depew, Kingwood, TX (US); David F. Heinrich, Tomball, TX (US); Vincent Nguyen, Houston, TX (US); David W. Engler, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 628 days.

(21) Appl. No.: 10/348,181

(22) Filed: Jan. 21, 2003

(65) Prior Publication Data

US 2004/0153723 A1    Aug. 5, 2004

(51) Int. Cl.
G06F 12/02 (2006.01)
G06F 12/16 (2006.01)

(52) U.S. Cl. .................... 711/170; 711/165
(58) Field of Classification Search ............. None
See application file for complete search history.

(56) References Cited

U.S. PATENT DOCUMENTS

| | | | |
|---|---|---|---|
| 5,928,367 A * | 7/1999 | Nelson et al. ............... 714/6 |
| 6,177,808 B1 * | 1/2001 | Heinrich et al. ............. 326/57 |
| 6,295,591 B1 * | 9/2001 | Bealkowski et al. ......... 711/165 |
| 6,587,909 B1 * | 7/2003 | Olarig et al. ............... 710/302 |
| 6,766,429 B1 * | 7/2004 | Bland et al. ................ 711/161 |
| 6,775,791 B2 * | 8/2004 | McAfee ........................ 714/6 |
| 6,928,514 B2 * | 8/2005 | Chatterjee et al. .......... 711/114 |
| 2002/0010875 A1 | 1/2002 | Johnson et al. |
| 2002/0042893 A1 | 4/2002 | Larson et al. |

OTHER PUBLICATIONS

Krontz et al., "Computer System Architecture With Hot Pluggable Main Memory Boards," U.S. Appl. No. 10/179,001, filed Jun. 25, 2002, 36 pp.
Jansen et al., "Hot-plug memory curtails server downtime," EE Times, Jan. 9, 2002, 5 pp., [online] http://www.eetimes.com/in_focus/communications/OEG20020109S0040.

* cited by examiner

Primary Examiner—Hyung Sough
Assistant Examiner—Duc T. Doan

(57) ABSTRACT

The specification may disclose a computer system that may have two memory boards operated in a mirrored mode. The computer system may have the ability to operate in a mirrored mode with the memory boards having varying amounts of memory. This feature may allow for adding main memory to the computer system while the computer system is operational.

8 Claims, 1 Drawing Sheet

METHOD AND APPARATUS FOR ADDING MAIN MEMORY IN COMPUTER SYSTEMS OPERATING WITH MIRRORED MAIN MEMORY

BACKGROUND

Computer systems may have main memory operated in a mirrored mode, meaning that two sets of main memory contents may be maintained within the computer. Should one of the sets of main memory contents fail as indicated, for example, by an uncorrectable error, the computer system may continue operating using the mirrored or second set, rather than experiencing a computer system failure. Computer systems operating mirrored main memory may implement the mirroring feature across two independent memory boards. Thus, if memory on one memory board experiences a failure, the computer system may continue to operate (in a non-mirrored state) using the remaining functional memory board while the failed memory board may be removed, repaired and/or replaced.

After initial insertion of a new or repaired memory board in a computer system designed to operate in mirrored mode, the newly inserted board may not have a complete copy of the main memory contents. The computer system may copy the data and programs, on a location-by-location basis, from the active memory board to a corresponding location in the new memory board. Because of the location-by-location copying, it may be necessary to operate main memory boards having the same amount of memory. Expanding the amount of main memory in a computer system designed to operate mirrored main memory may therefore require powering down the computer system and adding memory to the memory boards. Thus, it may not be possible to add main memory to a computer system while in operation, because at some point one of the memory boards may have a different amount of memory.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF EMBODIMENTS OF THE INVENTION

The following discussion is directed to various embodiments of the invention. The embodiments disclosed should not be interpreted or otherwise used as limiting the scope of the disclosure, including the claims, unless otherwise specified. In addition, one skilled in the art will understand that the following description has broad application. The discussion of any embodiment is meant only to be exemplary, and not intended to intimate that the scope of the disclosure, including the claims, is limited to these embodiments.

Figure 1:
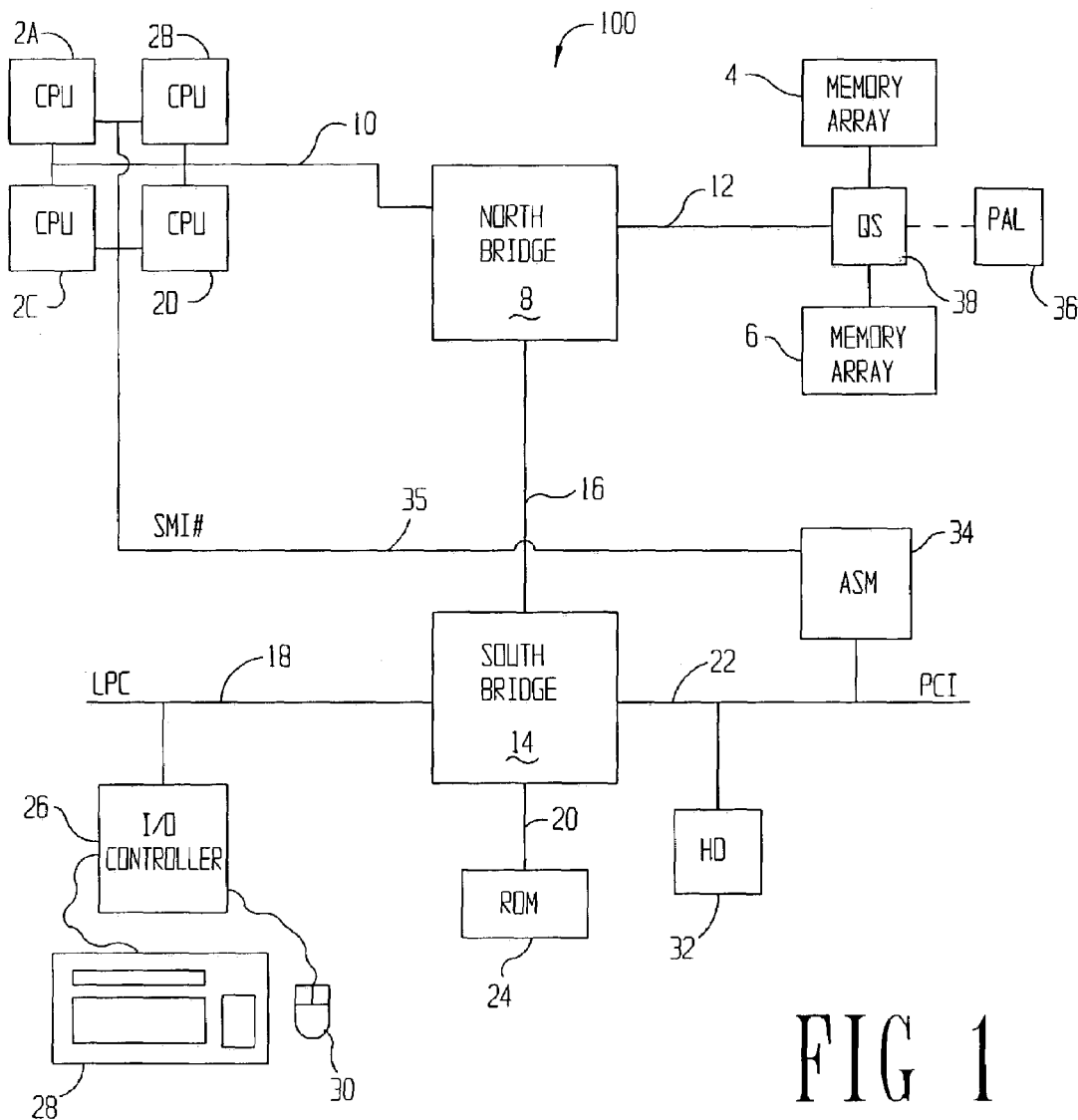
FIG. 1 illustrates a computer system constructed in accordance with embodiments of the invention.

FIG. 1 illustrates a computer system 100 implemented in accordance with embodiments of the invention. In particular, the computer system 100 may comprise a plurality of central processing units (CPUs or processors) 2A-D coupled to a main memory, which may be implemented using memory arrays on one or more memory boards 4, 6. The processors 2 may couple to the memory array on each memory board 4, 6 by way of a bridge logic unit 8. In the exemplary computer system 100, the bridge logic unit 8 may be termed "North Bridge" based on its location in computer system drawings. The processors may be Intel® Pentium® 4 XEON processors, or Itanium™ processors; however, any suitable processor or array of processors may be used without departing from the scope and spirit of the invention. The system 100 may be implemented using only a signal processor, if desired. The processors 2 may couple to the North Bridge 8 by way of a host bus 10.

The main memory on memory boards 4, 6 may couple to the North Bridge 8 through a memory bus 12. North Bridge 8 may comprise a memory control unit (not shown) that controls transactions to the main memory on memory boards 4, 6 by sending the necessary control signals during memory accesses. The main memory on the memory boards 4, 6 may function as the working memory for the processors 2 and may comprise, on each memory board, a conventional memory device or array of memory devices in which programs, instructions and data may be stored. Thus memory boards 4, 6 may each contain any suitable type of memory, such as dynamic random access memory (DRAM) or any other various types of DRAM devices such as synchronous (SDRAM), extended data output DRAM (EDO-DRAM), double-data-rate SDRAM (DDR SDRAM), and the like. In at least some of the embodiments, however, the main memory on memory boards 4, 6 may be implemented using DDR SDRAM packaged in dual in-line memory modules (DIMMS).

The computer system 100 illustrated in FIG. 1 may also comprise a second bridge logic device 14 that bridges a primary expansion bus 16 to various secondary buses, such as a low pin count (LPC) bus 18, a read only memory (ROM) bus 20, and a peripheral component interconnect (PCI) bus 22. Much like the North Bridge 8, the bridge device 14 may be referred to as a "South Bridge" based on its location in computer system drawings. In at least some embodiments, the North Bridge 8 and South Bridge 14 may be part of a chipset produced by Server Works, Inc., such as the Grand Champion™ HE Chipset.

In embodiments such as those illustrated by FIG. 1 utilizing the Grand Champion™ HE chipset, the primary expansion bus 16 may comprise a Thin Intermodule Bus, which is a proprietary bus of Server Works, Inc.; however, the computer system 100 illustrated in FIG. 1 is not limited to any particular type of chipset, and thus the primary expansion bus 16 may comprise other suitable buses such as a PCI bus, or a Hub-link bus (which is a proprietary bus of Intel Corporation).

Referring still to FIG. 1, a ROM device 24 may couple, by way of the ROM bus 20, to the South Bridge 14. The ROM 24 may contain software programs executable by the processors 2. The programs on ROM 26 may be basic input/output system (BIOS) commands, stackless code executed during power-on self test (POST) procedures, as well as dedicated programs that are executed based on the issuance of system management interrupts (SMIs) by various computer system devices, discussed more fully below.

Still referring to FIG. 1, the computer system 100 may also comprise a input/output (I/O) controller 26 that may couple to the South Bridge 14 by way of LPC bus 18. The I/O controller 26 may couple a keyboard 28, mouse 30 and various other input/output devices to the computer system 100.

The computer system 100 may further comprise a hard disk or hard drive (HD) 32 that may couple to the South Bridge 14 by way of PCI bus 22. While only a single hard disk is illustrated in FIG. 1, there may be multiple hard disks 32 operated as individual storage devices, or possibly in a redundant array of independent devices (RAID) configuration.

The computer system 100 may also comprise an advanced server management (ASM) device 34. The ASM 34 may couple to the South Bridge 14, and remaining computer system components, by way of the PCI bus 22. The ASM 34 may be a microcontroller programmed to act as a gateway between the internet, or other network systems, and components of the computer system 100. The ASM 34 may also couple to the processors 2 by way of a SMI# signal line 35. Assertion of the signal line 35 by the ASM 34 may act as a system management interrupt (SMI) to the processors, which in response may temporarily cease execution of an operating system and user level programs, and execute SMI routines to perform a variety of hardware level functions.

The memory boards 4, 6 may be selectively removed and added to the computer system without requiring the computer system 100 to shut down. Programmable array logic 36, which may couple to quick switch (QS) devices 38, may assist the computer system 100 in continuing to operate as the memory boards 4, 6 are removed and added to the system. In particular, the PAL 36 may assist with insertion and removal of the memory boards such as moving a latch prior to removal, opening the quick switch devices, detecting removal, detecting insertion, closing quick switch devices, communicating with the ASM 34, and the like. Co-pending patent application Ser. No. 10/179,001 filed Jun. 25, 2002 titled "Computer System Architecture With Hot Pluggable Main Memory Boards," incorporated by reference herein as if reproduced in full below, illustrates computer systems having the ability to accept hot pluggable main memory boards.

Embodiments of the invention, such as computer system 100 shown in FIG. 1, may utilize the main memory on memory boards 4, 6 in a mirrored fashion. That is, memory board 4 may contain a set of data and programs utilized by the processors 2. Likewise, memory board 6 may also contain a duplicate set of the data and programs used by processors 2—mirrored main memory. While one of the memory boards 4, 6 may be designated as the primary board for memory reads, each data write may take place to each memory board 4, 6. Should the memory board designated as "primary" experience a memory error, computer system 100 may remain operational by reading and writing to the memory board that did not experience the failure. In such a circumstance, the computer system 100 may also notify a computer system user of the fault, allowing the user to correct the problem with the faulty memory board, such as replacing or repairing the board.

Situations may exist where additional memory is desired in a computer system operating mirrored main memory. For example, computer system 100 operating in a mirrored mode may have four gigabytes of main memory, two gigabytes on each memory board 4, 6. Because of the mirrored operation, the processors 2 may only have an operational amount of two gigabytes of main memory. If it is desired to increase the operational amount of main memory, for example to four gigabytes, the memory capacity of each memory board 4, 6 may be increased to four gigabytes (eight gigabytes total).

In various embodiments of the present invention, memory may be added to the computer system 100 while it is in an operational state, even if the computer system 100 has no further available slots for insertion of memory boards. A first act in adding main memory may be removal of one of the memory boards 4, 6. Co-pending application Ser. No. 10/179,001 titled "Computer System Architecture with Hot Pluggable Main Memory Boards," incorporated by reference above, may describe the acts the computer system 100 may utilize in powering-down, disconnecting, and allowing removal of a memory board. The first step in this process may be notifying. The computer system first may be notified that a memory board is to be removed. This notification may take place electronically, or may take place by changing the position of a latch or switch on the memory board. Once the computer system is notified that the board is to be removed, the computer system may "break the mirror," forcing the computer system to operate in a non-mirrored state using the remaining memory board. Thereafter, the computer system may power-down the board to be removed and notify a user that removal is possible. Once the memory board has been removed, main memory may be added to the removed memory board, such as by installing additional main memory devices or replacing existing devices with devices of larger capacity. Once the computer user has completed the memory upgrade on the removed memory board, the memory board may be inserted into the computer system 100.

Insertion of the memory board with additional memory may invoke BIOS routines which may apply power, and configure and initialize the memory on the newly inserted memory board. Once initialized, in at least some embodiments, the North Bridge 8 may copy data and programs to the newly installed memory board from the memory board that remained in the system. The copying may be in preparation for returning to mirrored operation.

Embodiments of the invention copy data from the memory board 4, 6 that remained to the newly installed memory board, possibly on a row-by-row basis within each memory bank. A memory board 4, 6 in accordance with embodiments of this invention may comprise a plurality of sockets (not specifically shown) for accepting main memory packaged in memory modules, such as dual inline memory modules (DIMMS). The main memory on each DIMM device may be divided logically into a plurality of banks, and the data within each bank may be accessed on a row and column basis. Copying data from the memory board that remained in the computer system to the newly installed memory board may take place by copying, on a row-by-row basis within each bank, to a corresponding bank in the newly installed memory board. Main memory may be added to the memory board by installing additional memory modules in empty sockets on the memory boards 4, 6. Alternatively, the additional main memory may be installed by replacing memory modules on the memory boards 4, 6 with memory modules having larger memory capacity, i.e., longer rows, greater number of columns, or both.

Once the memory contents of the memory board that remained in the computer system are copied to the newly inserted memory board, mirroring may again be implemented with either memory board designated as "primary" for read purposes. The newly installed memory board may have a larger memory capacity than the memory board that remained; however, because the computer system 100 may be operating in a mirrored state without the memory board that remained in the system having a corresponding set of additional memory, the operating system may not be notified that additional memory is available.

The next step in adding memory to the computer system 100 may be removal of the second memory board in the computer system. Implementation of the removal of the second board may be similar to that of the first memory board. Once removed, the amount of memory on the removed memory board may be increased, such as by installing additional memory modules, replacing existing memory modules with modules having larger capacity, or a combination of both.

Upon insertion of the second memory board having an expanded memory capacity into the computer system 100, the BIOS may recognize the insertion, and power and initialize the memory on the newly inserted board. Thereafter, the BIOS may copy memory contents from the memory board that remained (and which has an expanded, but partially unused, memory capacity in this exemplary discussion) to the newly inserted board, and enable mirroring. Finally, once both memory boards 4, 6 have additional main memory, the BIOS may notify the operating system that additional memory may be available, possibly through Advanced Configuration Power Interface (ACPI) methods. Co-pending application Ser. No. 10/179,001 titled "Computer System Architecture With Hot Pluggable Main Memory Boards" may discuss making available the additional memory to the operating system.

Figure 2:
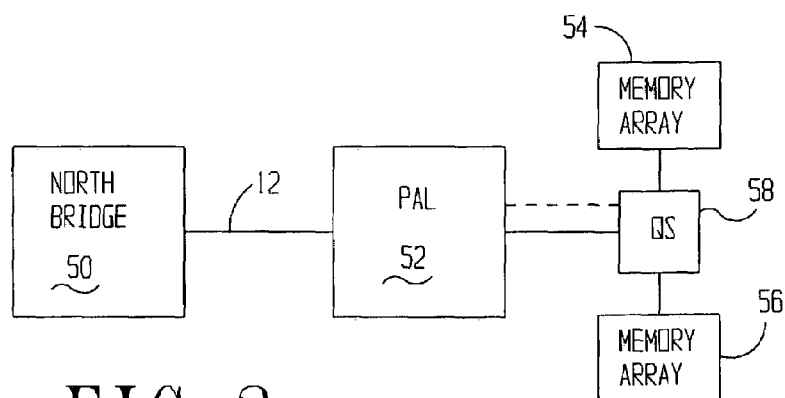
FIG. 2 illustrates a partial computer system implementation in accordance with embodiments of the invention.

In the embodiments described with respect to FIG. 1, the chipset, in particular the North Bridge 8, may be responsible for implementing mirroring as well as copying memory contents from board to board after insertion of a new memory board. FIG. 2 illustrates alternative embodiments of the invention in which a North Bridge 50 may not directly support main memory operating in a mirrored mode. In the alternative embodiments, a programmable array logic 52 may couple between the memory boards 54, 56 and the North Bridge 50 on the memory bus 12. In the alternative embodiments, the North Bridge 50 may not be aware that memory mirroring is utilized in the computer system. In this situation, the North Bridge 50 may make memory writes, which the PAL 52 may accept and convert such that each memory write takes place to both memory board 54, 56. For memory reads, the North Bridge 50 may assert various control signals to the PAL 52, which may in turn read the requested data from either memory board 54 or memory board 56, whichever may be designated as primary.

Increasing the amount of memory in the embodiments illustrated in FIG. 2 may involve removal of one of the memory boards 54, 56, and to facilitate removal, PAL 52 may control the quick switches 58 in a manner similar to PAL 36 of the embodiments illustrated of FIG. 1. After reinsertion of the upgraded memory board, PAL 52 may invoke, or cause to be invoked, system management interrupts (SMIs) by communicating with ASM 34, which in turn may assert the SMI# signal line 35. The SMIs may invoke BIOS routines to perform the copying of memory contents from the memory board that remained in the computer system to the newly inserted memory board. This may be accomplished, for example, by reading memory locations on the memory board that remained, then writing the same location (with PAL 52 directing the writes to both memory boards). Data may be copied in small portions using numerous SMIs to avoid staying in the SMI mode too long, which may adversely affect computer system operation. Once copying is complete, either the North Bridge 50 or the PAL 52 may designate the newly inserted board as the primary memory board in the system, thus allowing removal of the other memory board, upgrading of the memory of the other memory board, and re-installation. Once the memory contents have been copied to the re-installed board, the computer system 100 again may operate in a mirrored mode. The BIOS may then notify the operating system, possibly through ACPI methods, of the newly available main memory.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system comprising:
   a processor;
   a first memory array and a second memory array;
   a first bridge logic coupling the processor to the first and second memory arrays;
   wherein the computer system operates the first and second memory arrays in a mirrored mode even if the first and second memory arrays have differing memory capacities;
   a programmable array logic (PAL) coupled between the first bridge logic and the first and second memory arrays, wherein the programmable array logic operates the first and second memory arrays in the mirrored mode;
   wherein the computer system remains operational if the first memory array is removed from the computer system, and wherein the PAL invokes basic input output system (BIOS) routines to copy the information from the second memory array to the first memory array if the first memory array is installed with a greater memory capacity than the second memory array.

2. The computer system as defined in claim 1 further comprising:
   wherein the first memory array further comprises a memory board comprising at least one dual inline memory module (DIMM); and
   wherein the second memory array further comprises a memory board comprising at least one dual inline memory module (DIMM).

3. The computer system as defined in claim 1 further comprising:
   wherein the first memory array further comprises double-data-rate synchronous dynamic random access memory (DDR SDRAM); and
   wherein the second memory array further comprises DDR SDRAM.

4. A method comprising:

operating a computer system having a first and second main memory boards in a fully mirrored mode of operation, the mirroring across the first and second main memory boards;

removing the first main memory board from the computer system while continuing to read and write the second main memory board;

installing a third main memory board in the computer system while continuing to read and write the second main memory board, the third main memory board having a larger memory capacity than the second main memory board;

invoking basic input output system (BIOS) routines by a programmable array logic (PAL) coupled between the memory boards and a bridge device, the BIOS routines copy the information from the second memory board to the third memory board; and operating the computer in the fully mirrored memory mode across the second and third main memory boards.

5. The method as defined in claim 4 wherein the first and third main memory boards are the same memory board.

6. The method as defined in claim 4 further comprising:

removing the second main memory board from the computer system while continuing to read and write the third main memory board;

installing a fourth main memory board in the computer system while continuing to read and write the third main memory board, the fourth main memory board having a same memory capacity as the third main memory board;

invoking basic input output system (BIOS) routines to copy the information from the third memory board to the fourth memory board; and operating the computer in the mirrored memory mode across the third and fourth main memory boards.

7. The method as defined in claim 6 wherein the second and fourth main memory boards are the same memory board.

8. The method as defined in claim 7 wherein the first and third main memory boards are the same memory board.

\* \* \* \* \*